United States Patent
Zamel et al.

(10) Patent No.: US 7,155,091 B2
(45) Date of Patent: Dec. 26, 2006

(54) COOLED HIGH POWER LASER LENS ARRAY

(75) Inventors: James M. Zamel, Rolling Hills Estates, CA (US); Michael G. Wickham, Rancho Palos Verdes, CA (US); Stephen J. Brosnan, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/063,705

(22) Filed: Feb. 22, 2005

(65) Prior Publication Data
US 2006/0188195 A1 Aug. 24, 2006

(51) Int. Cl.
*G02B 6/04* (2006.01)
*F28F 7/00* (2006.01)

(52) U.S. Cl. .................. 385/33; 385/115; 385/119; 165/185

(58) Field of Classification Search ............... 385/33, 385/34, 115–119, 147; 165/185; 174/252
See application file for complete search history.

(56) References Cited

U.S. PATENT DOCUMENTS

| | | | | |
|---|---|---|---|---|
| 4,611,124 A | * | 9/1986 | Schneider | ................ 250/208.1 |
| 5,077,637 A | * | 12/1991 | Martorana et al. | .......... 361/717 |
| 5,276,758 A | | 1/1994 | Hughes et al. | |
| 5,315,683 A | * | 5/1994 | Miller | ........................ 385/136 |
| 5,316,080 A | * | 5/1994 | Banks et al. | ................ 165/185 |
| 5,862,278 A | | 1/1999 | Brauch et al. | |
| 6,217,205 B1 | | 4/2001 | Ward | |
| 6,260,614 B1 | * | 7/2001 | Guy | .......................... 165/185 |
| 6,400,871 B1 | | 6/2002 | Minden | |

* cited by examiner

*Primary Examiner*—Sarah Song
(74) *Attorney, Agent, or Firm*—Carmen B. Patti & Assoc., LLC

(57) ABSTRACT

An array of cylindrical end-caps with separate or integral lenses is stacked with its members in close contact, forming inter-cylinder gaps between every subset of three adjacent cylindrical lenses. Conductive fibers are disposed in the inter-cylinder gaps. Heat that would otherwise accumulate in the array is removed through the conductive fibers and transmitted to an external heat sink.

17 Claims, 1 Drawing Sheet

COOLED HIGH POWER LASER LENS ARRAY

BACKGROUND OF THE INVENTION

This invention relates generally to high power lasers and, more particularly, to high power lasers in which many fiber lasers are combined in a single array. Combining the outputs of optical fiber lasers is emerging as a preferred technique for obtaining high powers from fiber lasers for both military and industrial uses. The fiber lasers are optically pumped to produce outputs that are combined and collimated into a single composite output beam of usefully high power. Such lasers producing output beams of several hundreds of watts power are already available. The present invention is more concerned with fiber laser arrays that can produce output powers measured in tens of kilowatts.

Fiber lasers in such arrays must be controlled in phase to produce a coherent composite output beam. There are various techniques for achieving beam coherency and thereby optimizing beam quality but the present invention is not concerned with these techniques. A critical feature of an array of fiber lasers is a lens array to which the fibers are coupled. Typically, each fiber is bonded to its own beam expander or end-cap in the array, which may have an integral or separate lens at the end of it. These individual end-caps take the form of cylindrical rods. Light entering one end of a rod or cylindrical end-cap from a fiber diverges as it passes along the rod and is collimated as it passes through one or more curved faces at the other end. The length and diameter of the cylinders are selected in accordance with the power emitted by a single fiber laser. Fiber lasers with higher output powers require the use of longer and thicker rod lenses, to allow the fiber output to diverge.

One factor that limits the total output power passing through a fiber lens array is the tendency of the array to overheat during prolonged periods of operation. Although the power dissipated in each element of the array is only a small fraction of the total power transmitted through the end-cap, over time even this low level of power dissipation heats the array to an unacceptable level, especially near the center of the array. Because the lens array must necessarily be as compact as possible, conventional cooling approaches do not address this problem.

Accordingly, there is a need for a fiber lens array structure that overcomes this problem.

SUMMARY OF THE INVENTION

The present invention resides in an array of cylindrical end-caps from which heat is removed along inter-cylinder gaps in the array. Briefly, and in general terms, the invention may be defined as a fiber laser lens array comprising an array of cylindrical end-caps with separate or integral lenses stacked in close contact such that an inter-cylinder gap is formed between every subset of three adjacent lenses in the array; and means for removing heat from the array along thermal paths that extend along the inter-cylinder gaps.

More specifically, the means for removing heat from the array comprises an external heat sink and a plurality of thermally conductive fibers extending along the inter-cylinder gaps and away from the array, and terminating in the external heat sink. Preferably, the means for removing heat from the array further comprises a quantity of thermally conductive filler material in each inter-cylinder gap, to thermally bond the thermally conductive fibers to the cylindrical cylinders. The thermally conductive filler material may be, for example, solder or a conductive epoxy. The thermally conductive fibers may be a conductive metal, such as copper, or of a graphite material.

It will be appreciated from the foregoing summary that the present invention represents a significant advance in the field of high power lasers that use arrays of optical fiber lasers. In particular, the invention allows higher powers and longer times of operation to be reached by conducting accumulated heat away from the cylindrical lens array, through the inter-cylindrical gaps in the array. Other aspects and advantages of the invention will become apparent from the following more detailed description, taken in conjunction with the accompanying drawings.

DETAILED DESCRIPTION OF THE INVENTION

Figures 1, 2:
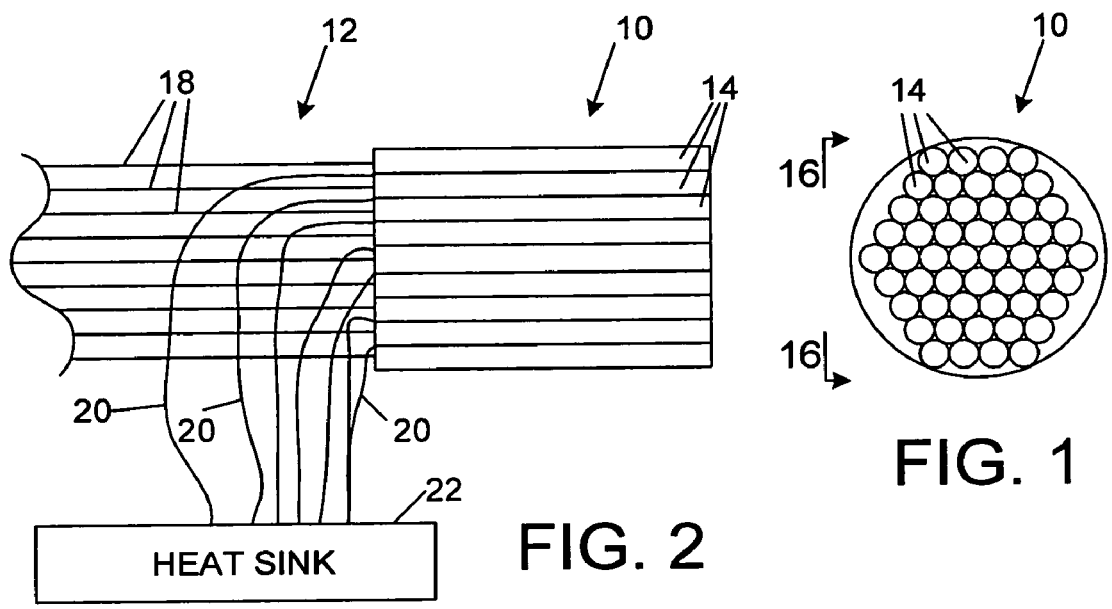
FIG. 1 is a cross-sectional view of a lens array made up of cylindrical end-caps with integral lenses, taken in an axial direction along the array elements.
FIG. 2 is a diagrammatic view of a lens array in accordance with the invention, including a longitudinal elevation of the array taken in the direction 2—2 of FIG. 1.

As shown in the drawings for purpose of illustration, the present invention is concerned with high power laser fiber lens arrays. As noted above, fiber lens arrays tend to overheat during prolonged operation at high powers. In accordance with the present invention, a fiber lens array is cooled by conducting heat from inter-lens gaps in the array, as will now be explained in more detail.

FIGS. 1 and 2 diagrammatically illustrate a cylindrical lens array, indicated generally by reference numeral 10, and a corresponding array of optical fiber lasers 12, only portions of which are shown in FIG. 1. By way of example, the lens array is shown as including fifty-two cylindrical lenses 14 arranged in a hexagonal pattern with each lens in close contact with as few as three and as many as six other lenses. At the output end of the array 10, indicated at 16, the end facet of each lens 14 is contoured to provide a collimation function as light emerges from the lens. At the opposite or input end of the array 10, each cylindrical lens 14 receives input light from a corresponding fiber laser 18 that is part of the fiber laser array 12. The fiber lasers 18 may be coupled to the cylindrical lenses 14 by any suitable method, such as by bonding.

Figure 3:
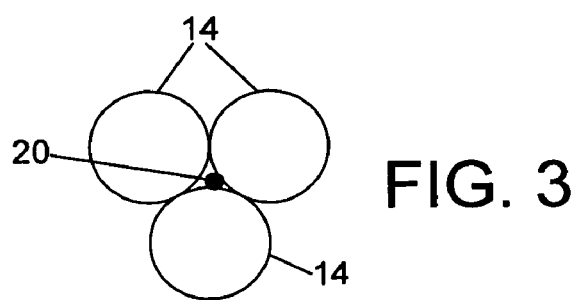
FIG. 3 is an enlarged fragmentary view similar to FIG. 1 but showing only three adjacent cylinder lenses.

In a presently preferred embodiment of the invention, the cylindrical lenses 14 are cooled by introducing thermally conductive fibers 20 into at least some of the inter-cylinder spaces, as best shown in FIG. 3. The conductive fibers 20 extend along practically the full length of the array 10 and form a set of conductive paths to a heat sink 22, where they are terminated. The thermally conductive fibers 20 may be of a metal, such as copper, or may be of a carbon-based material, such as graphite. In the spaces between the cylindrical lenses 14, the conductive fibers 20 are thermally bonded to the outer walls of the cylindrical lenses. This thermal bonding may be effected by filling the surrounding spaces with solder or by potting the spaces with a thermally conductive epoxy. The choice in this regard is determined in part by the amount of power handled by the array and the fraction of that power that is dissipated in the lenses 14. The heat sink 22 may be simply a large thermal mass, or it may incorporate a circulating fluid to conduct the heat away to another heat sink (not shown).

The laser fibers 18 may have beam powers on the order of a few hundred watts or as high as several kilowatts per fiber. Typically, the fibers 18 each have a core diameter of 20 µm to 50 µm plus cladding layers, while the diameter of the cylindrical lenses 14 may be, for example, 4 mm or greater for higher powers. As mentioned above, the length of the lenses 14 is dependent on the power output and is dictated by the anti-reflection coating on the output end of the end-cap which is fluence limited. The end-cap material may be, for example, fused silica. Since the lenses 14 are so much larger in diameter than the laser fibers 18, there is no difficulty in routing the conductive fibers 20 between the laser fibers to reach the heat sink 22. If necessary in a particular application, the conductive fibers 20 may be secured in position between the laser fibers 18 by a suitable epoxy or other potting material.

Because more heat accumulates near the middle of the lens array 10 than near its periphery, the arrangement of conductive fibers 20 may be biased to remove more heat from this central region of the array. For example, larger conductive fibers 20 may be used in the central region, or more fibers 20 may be positioned in the central region than in the outer region of the array 10.

For lower total output powers, sufficient cooling of the array 10 may be effected by moving a cooling fluid, such as air, through the spaces between the cylindrical lenses, though depending on the wavelength of the laser beam, fluids may disrupt or jitter the beam.

It will be appreciated from the foregoing that the present invention represents a significant advance in the field of fiber laser arrays. In particular, high output powers can be achieved by cooling the cylindrical lens array by making use of thermally conductive paths in the gaps between the cylindrical lenses. It will also be understood that, although specific embodiments of the invention have been illustrated and described for purposes of illustration, various modifications may be made without departing from the spirit and scope of the invention. Accordingly, the invention should not be limited except as by the appended claims

The invention claimed is:

1. A fiber laser lens array, comprising:
   an array of cylindrical end-caps with separate or integral lenses stacked in close contact such that an inter-cylinder gap is formed between every subset of three adjacent cylindrical end-caps in the array; and
   means for removing heat from the array along thermal paths that extend along the inter-cylinder gaps in the array;
   wherein the means for removing heat is biased to remove more heat from a central region of the array than from a periphery of the array; and
   wherein the means for removing heat comprises the use of thermally conductive fibers in the central region of the array that are larger than thermally conductive fibers used in an outer region of the array.

2. A fiber laser lens array as defined in claim 1, wherein the means for removing heat from the array further comprises:
   an external heat sink; and
   a plurality of thermally conductive fibers extending along the inter-cylinder gaps and away from the array, and terminating in the external heat sink.

3. A fiber laser lens array as defined in claim 2, wherein the means for removing heat from the array further comprises a quantity of thermally conductive filler material in each inter-cylinder gap, to thermally bond the thermally conductive fibers to the cylindrical cylinders.

4. A fiber laser lens array as defined in claim 3, wherein the thermally conductive filler material is a solder.

5. A fiber laser lens array as defined in claim 3, wherein the thermally conductive filler material is a conductive adhesive.

6. A fiber laser lens array as defined in claim 2, wherein the thermally conductive fibers are of metal.

7. A fiber laser lens array as defined in claim 6, wherein the thermally conductive fibers are of copper.

8. A fiber laser lens array as defined in claim 2, wherein the thermally conductive fibers are of a thermally conductive non-metal.

9. A fiber laser lens array as defined in claim 8, wherein the thermally conductive fibers are of graphite.

10. A fiber laser lens array as defined in claim 1, wherein the cylindrical end-caps material are fused silica.

11. A fiber laser lens array, comprising:
    an array of cylindrical end-caps stacked in close contact in a hexagonal stack such that an inter-cylinder gap is formed between every subset of three adjacent cylindrical lenses in the array;
    an external heat sink;
    a plurality of thermally conductive fibers extending along the inter-cylinder gaps and away from the array, and terminating in the external heat sink, wherein the plurality of thermally conductive fibers are biased to remove more heat from a central region of the array than from a periphery of the array, and wherein the plurality of thermally conductive fibers used in the central region of the array are larger than the plurality of thermally conductive fibers used in an outer region of the array; and
    a thermally conductive filler material surrounding each of the thermally conductive fibers and making thermal contact with the cylindrical lenses.

12. A fiber laser lens array as defined in claim 11, wherein the thermally conductive fibers are of metal.

13. A fiber laser lens array as defined in claim 12, wherein the thermally conductive fibers are of copper.

14. A fiber laser lens array as defined in claim 11, wherein the thermally conductive fibers are of a thermally conductive non-metal.

15. A fiber laser lens array as defined in claim 14, wherein the thermally conductive fibers are of graphite.

16. A fiber laser lens array as defined in claim 11, wherein the thermally conductive filler material is a solder.

17. A fiber laser lens array as defined in claim 11, wherein the thermally conductive filler material is a conductive adhesive.

* * * * *